US008166831B2

(12) United States Patent
Ruan

(10) Patent No.: US 8,166,831 B2
(45) Date of Patent: May 1, 2012

(54) FORCE MEASURING RIGID LOAD BINDER

(75) Inventor: Buqin Ruan, Zhugang Town (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 296 days.

(21) Appl. No.: 12/578,261

(22) Filed: Oct. 13, 2009

(65) Prior Publication Data

US 2011/0000317 A1  Jan. 6, 2011

(30) Foreign Application Priority Data

Jul. 6, 2009  (CN) .......................... 2009 1 0158316

(51) Int. Cl.
*G01L 5/04* (2006.01)
(52) U.S. Cl. .................................... 73/862.42
(58) Field of Classification Search ............... 73/862.42
See application file for complete search history.

(56) References Cited

U.S. PATENT DOCUMENTS

| 2,422,001 | A | * | 6/1947 | Durbin ............................ | 24/270 |
| 2,500,488 | A | * | 3/1950 | Durbin et al. .................... | 24/270 |
| 4,423,639 | A | * | 1/1984 | Grade et al. ................ | 73/862.42 |
| 4,512,062 | A | * | 4/1985 | Crook, Jr. ...................... | 24/71 R |
| 7,055,804 | B2 | * | 6/2006 | Scott ............................. | 254/231 |
| 7,231,693 | B2 | * | 6/2007 | Wilcox et al. ................. | 24/68 R |
| 7,313,975 | B1 | * | 1/2008 | Scorteanu ................ | 73/862.454 |
| 7,428,769 | B2 | * | 9/2008 | Fontaine et al. ................ | 24/130 |
| 7,509,711 | B2 | * | 3/2009 | Hsieh ........................ | 24/68 CD |
| 7,913,363 | B2 | * | 3/2011 | Scott ............................ | 24/68 CT |

FOREIGN PATENT DOCUMENTS

CN          2827932 Y    10/2006
* cited by examiner

Primary Examiner — Lisa Caputo
Assistant Examiner — Octavia Davis-Hollington
(74) Attorney, Agent, or Firm — Minder Law Group; Willy H. Wong

(57) ABSTRACT

The present invention provides a force measuring rigid load binder in the field of goods holding. The force measuring rigid load binder of the invention address the problems of conventional force measuring rigid load binders, such as potential damages to goods, adverse affection on goods transportation, increased difficulty in manual control, time and labor consumption and inconsistent tensioning forces of the binding belt. The force measuring rigid load binder of the invention includes a tensioning mechanism having a handle. Each of both ends of the tensioning mechanism is connected with a hook respectively. The tensioning mechanism is made of a rigid material. The distance between two hooks could be adjusted by the tensioning mechanism when the handle is pulled. A sensor is provided at a forced part of the tensioning mechanism, which could generate a signal corresponding to the size of the tensioning force when the load binder is in operation. The sensor is connected with a signal processing circuit which could receive and process said signal. A display device is connected with the signal processing circuit to display the size of the tensioning force. The force measuring rigid load binder of the invention has advantages including timely availability of the size of the tensioning force of the load binder, a high safety property, a compact structure and a low manufacturing cost.

12 Claims, 7 Drawing Sheets

FORCE MEASURING RIGID LOAD BINDER

BACKGROUND OF THE INVENTION

1. Field of Invention

The present invention relates to a device for holding goods in logistics transportation, in particular, to a force measuring rigid load binder.

2. Related Art

Goods usually need be bound during transportation to prevent goods from falling off or collision, thereby reducing losses and damages. The load binder is an advanced binding device, by use of which the goods could be conveniently and safely bound. Thus, the load binder is very popular amongst drivers. In order to improve the load binder, long-term search has been made and various kinds of modifications have been proposed.

For example, Chinese Patent CN2827932Y provides a lever fastener comprising a main pole, a U-shape pole and an iron lock. The main pole is configured to be Z-shaped. The inner end of the main pole is hinged to the U-opening end of the U-shape pole. The main pole is moved to swing the Z-shape protrusion from of the main pole from the upper part of the U-shape pole to the lower part thereof. A binding belt is linked with one end of the U-shape pole. The other end of the binding belt is linked with the protrusion at the central part of the main pole. The binding belt connected with the protrusion at the central part of the main pole would swing to the lower part of the U-shape pole when the goods are to be bound. The main pole is pulled to tighten the biding belt so as to bind the goods in said patent. However, the condition of the tensioning force of the binding belt could not be understood in the above-mentioned load binder and then the load binder is difficult to be controlled. Therefore, goods are usually damaged and the binding belt is broken for they are bound overtight. Or, goods transportation is adversely affected because the goods are not bound sufficiently tight.

Furthermore, the forces used to bind different kinds of goods or same goods at different positions are different when the goods are to be bound, which aggravates the difficulty in manual control. It would be labor and time consuming if each load binder has to be controlled independently. On the other hand, the tensioning force of the binding belt of the load binder could be varied due to dumping or shaking during transportation. In this case, the tensioning force of the binding belt is over-large at some sites and too small at some other sites.

SUMMARY OF THE INVENTION

The present invention provides a force measuring rigid load binder to address the problems mentioned above, which could acquire the size of the tensioning force of the load binder in time, and has a favorable safety property, a compact structure and a low manufacturing cost.

To achieve the purpose, the present invention provides a force measuring rigid load binder, including a tensioning mechanism having a handle. Each of both ends of the tensioning mechanism is connected with a hook respectively. The tensioning mechanism is made of a rigid material. The distance between two hooks could be adjusted by the tensioning mechanism when the handle is pulled. A sensor is provided at a forced part of the tensioning mechanism, which could generate a signal corresponding to the size of the tensioning force when the load binder is in operation. The sensor is connected with a signal processing circuit which could receive and process said signal. A display device is connected with the signal processing circuit to display the size of the tensioning force.

The manufacturing cost could be largely reduced due to the fact that the sensor is directly provided at the forced part of the load binder by making full use of the configuration of the existing load binder without modifying the configuration to a large extent. The size of the tensioning force of the load binder could be conveniently detected by using the sensor. The detected signal could be transmitted to the signal processing circuit which could display the processed value of the tensioning force visually on the display device. In this connection, the operator could expediently and timely control the size of the tensioning force of the load binder, thereby improving the expediency and safety of the load binder in use.

According to the force measuring rigid load binder of the invention, the tensioning mechanism includes a connection piece and an adjustment piece, the connection piece is connected with a hook at the outer end and connected with one end of the adjustment piece through threads at the inner end. The other end of the adjustment piece is connected with the other hook. The handle is linked with the adjustment piece and could drive the adjustment piece to turn. The forced part is the connection piece or the adjustment piece.

The handle is pulled when the goods need be bound in the load binder of the invention, and the adjustment piece is driven by the handle to turn, in which case the connection piece comes closer to the adjustment piece along threads. Apparently, the distance between said two hooks is shortened, and thus the goods are bound tightly. The sensor here could be provided on the connection piece or the adjustment piece. Moreover, each of both ends of the adjustment piece could be connected with a connection piece through threads, on which a hook is provided. In this connection, said two connection pieces are brought to move when the adjustment piece turns.

According to the force measuring rigid load binder of the invention, the sensor is a resistance strain gauge and fixed on the outer wall of the adjustment piece. A casing is held on the adjustment piece outside the sensor. The signal processing circuit connected with the sensor is positioned within the casing.

In accordance with the working principle of the resistance strain gauge sensor, an elastic body is flexibly deformed under external force to distort the resistance strain gauge attached to the surface of the elastic body. The value of resistance of the resistance strain gauge would increase or decrease once it is deformed. Such a variance in resistance could be converted into an electric signal voltage or current via a relevant measuring circuit. Therefore, the external force could be converted into an electric signal. In combination with said invention, the casing is so slightly deformed under the tensioning force that the resistance strain gauge on the inner wall of the casing is deformed correspondingly, and an electric signal corresponding to the size of the tensioning force is generated. The casing herein could protect the sensor and facilitate installation of the signal processing circuit.

According to the force measuring rigid load binder of the invention, the display device includes a display connected with the signal processing circuit. A window is set on the casing, in which the display is secured. A cover is further set on the casing for covering the window.

The operator could acquire the size of the tensioning force in a much convenient way in the operation of the load binder because the display is directly fixed on the casing. Furthermore, the display could be efficiently protected with the cover.

According to the force measuring rigid load binder of the invention, the display device includes a wireless signal transmission module for transmitting a wireless signal and an exterior reception device for receiving said wireless signal linked with the signal processing circuit.

The signal of size of the tensioning force could be transmitted to the exterior reception device by the wireless signal transmission module, in which case a remote monitoring is accomplished. This way, the operation condition of one or more load binders could be obtained. Furthermore, it could be discovered in time whether the tensioning force of the load binder is changing or not during transportation.

According to the force measuring rigid load binder of the invention, the casing is made of plastic and fixed on the adjustment piece by injection molding. The casing herein could also be held on the load binder after molding.

According to the force measuring rigid load binder of the invention, a groove is set on the outer wall of the adjustment piece, in which the sensor is held.

The groove is provided to make the deformation of the adjustment piece more conveniently and precisely perceived by the sensor, in which situation the operation precision and sensitivity of the sensor are enhanced.

According to the force measuring rigid load binder of the invention, the signal processing circuit includes a circuit board which could receive and process the signal corresponding to the size of the tensioning force and a power supply connected to the circuit board for supplying power to the entire signal processing circuit. The power supply is a storage battery. The battery could be conveniently recharged when it runs out of power, and thus the use cost is reduced.

According to the force measuring rigid load binder of the invention, the circuit board is further linked with a configuration means for setting the threshold of the tensioning force and a warning means for sending a warning signal when the tensioning force exceeds the set threshold.

The operator could be noticed and the warning threshold of the tensioning force could be independently set as required by using the above-described structure. The warning means herein could be implemented by sound, light or the combination thereof.

According to the force measuring rigid load binder of the invention, a ratchet is fixedly connected to the adjustment piece. An opening is set at the inner end of the handle and coupled with the adjustment piece. A pawl is provided on the handle, which could be embedded among the teeth of the ratchet. A spring is placed between the pawl and the handle. The pawl is embedded among the teeth of the ratchet under the elastic force of the spring.

The adjustment piece could only continuously turn in one way by way of the pawl and ratchet when the handle is pulled to and fro. Obviously, the connection piece could come closer to the adjustment piece along the threads after the adjustment piece continuously turns in one way.

The force measuring rigid load binder of the invention has the advantages as follows over the prior art. Firstly, the size of the tensioning force of the load binder could be detected in real time through the sensor, so that the operation condition of the load binder could be timely understood by the operator for further processing. Secondly, the load binder of the invention could be operated and used in a rather convenient way, in which case the safety and reliability in goods binding are efficiently improved. Last but not least, the parts of the load binder are made full use of, and the configuration of the load binder need not be modified to a large extent, producing a compact structure and a low cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

Figure 1:
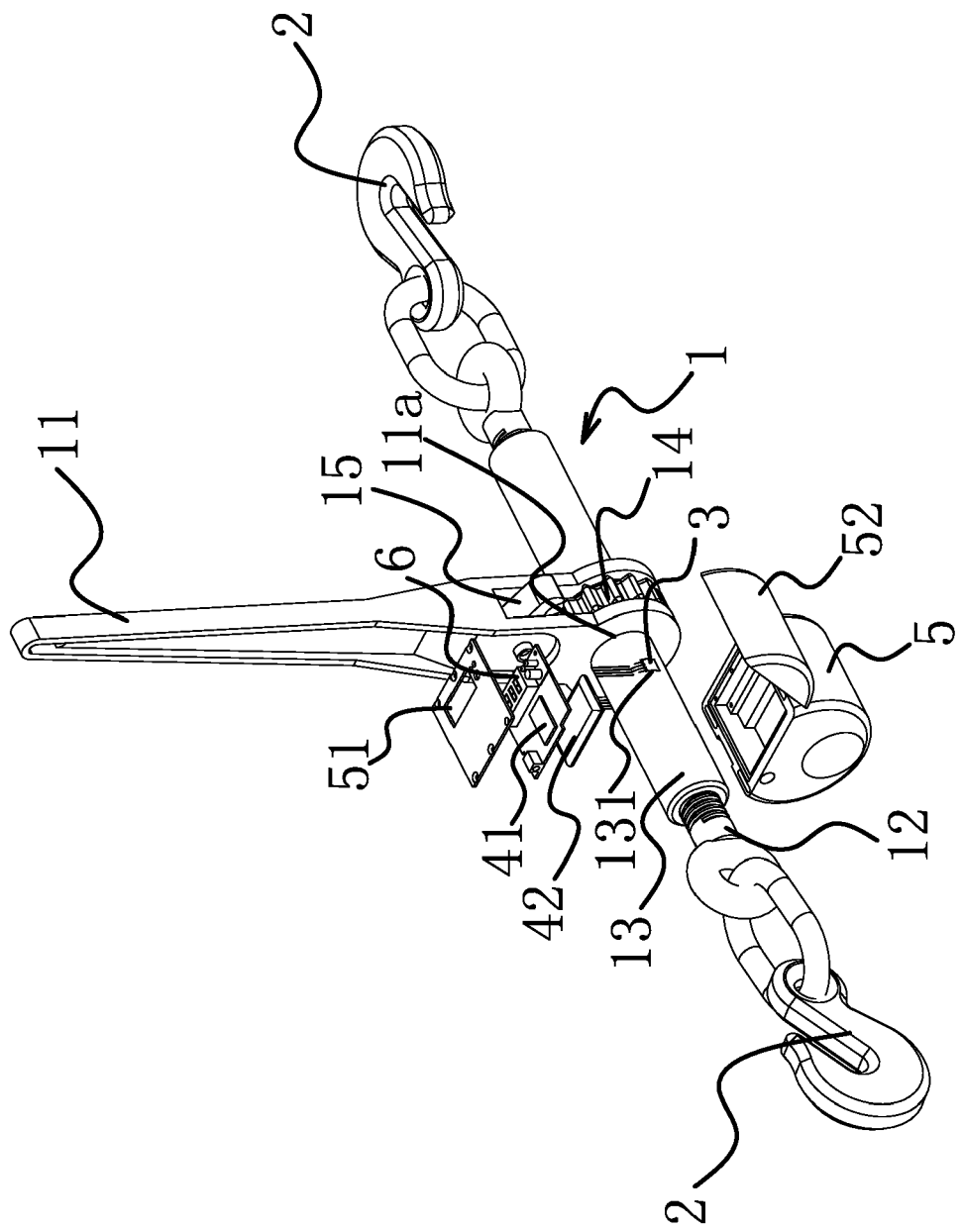
FIG. 1 is an exploded view of a force measuring rigid load binder of the invention.
Figure 2:
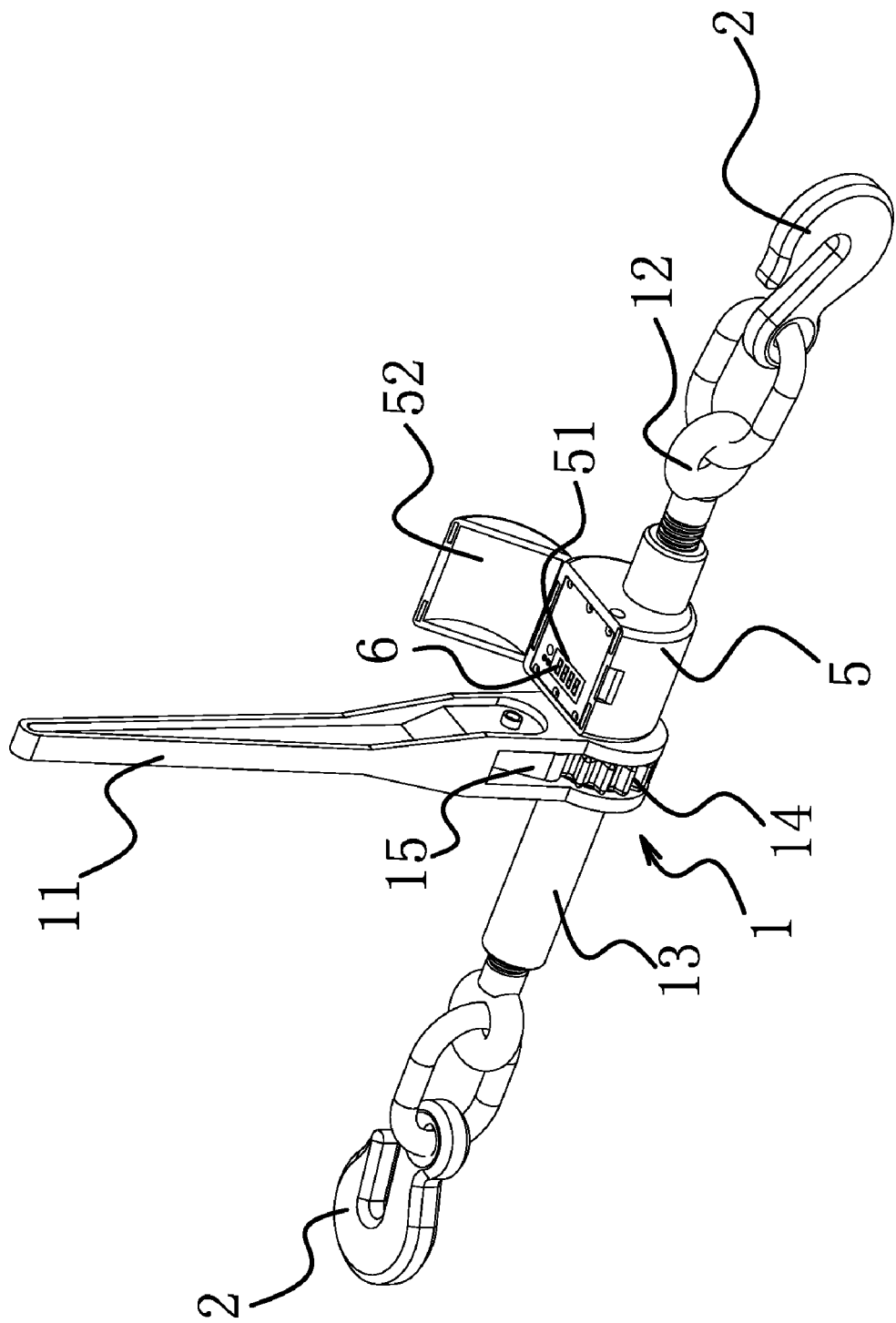
FIG. 2 is a stereogram of the load binder of the invention.

As shown in FIGS. 1-6, the force measuring rigid load binder of the invention includes a tensioning mechanism 1 having a handle 11. Each of both ends of the tensioning mechanism 1 is connected with a hook 2. The tensioning mechanism 11 is made of a rigid material. The distance between two hooks 2 could be adjusted by the tensioning mechanism 1 when the handle 11 is pulled. A sensor 3 is provided at a forced part of the tensioning mechanism 1, which could generate a signal corresponding to the size of the tensioning force when the load binder is in operation. The sensor 3 is connected with a signal processing circuit 4 which could receive and process said signal. A display device is connected with the signal processing circuit 4 to display the size of the tensioning force.

In FIGS. 1-5, the tensioning mechanism 1 includes a connection piece 12 and an adjustment piece 13. The connection piece 12 is connected with a hook 2 at the outer end and connected with one end of the adjustment piece 13 through threads at the inner end. The other end of the adjustment piece 13 is connected with the other hook 2. The handle 11 is linked with the adjustment piece 13 and could drive the adjustment piece 13 to turn. The forced part is the adjustment piece 13 in said embodiment, which could also be the connection piece 12 in practice. Moreover, the other hook 2 could be directly connected to the other end of the adjustment piece 13. Alternatively, the other hook 2 could be connected to the other end of the adjustment piece 13 through another connection piece 12, in which case the connection piece 12 is connected with the adjustment piece 13 through threads.

Figure 3:
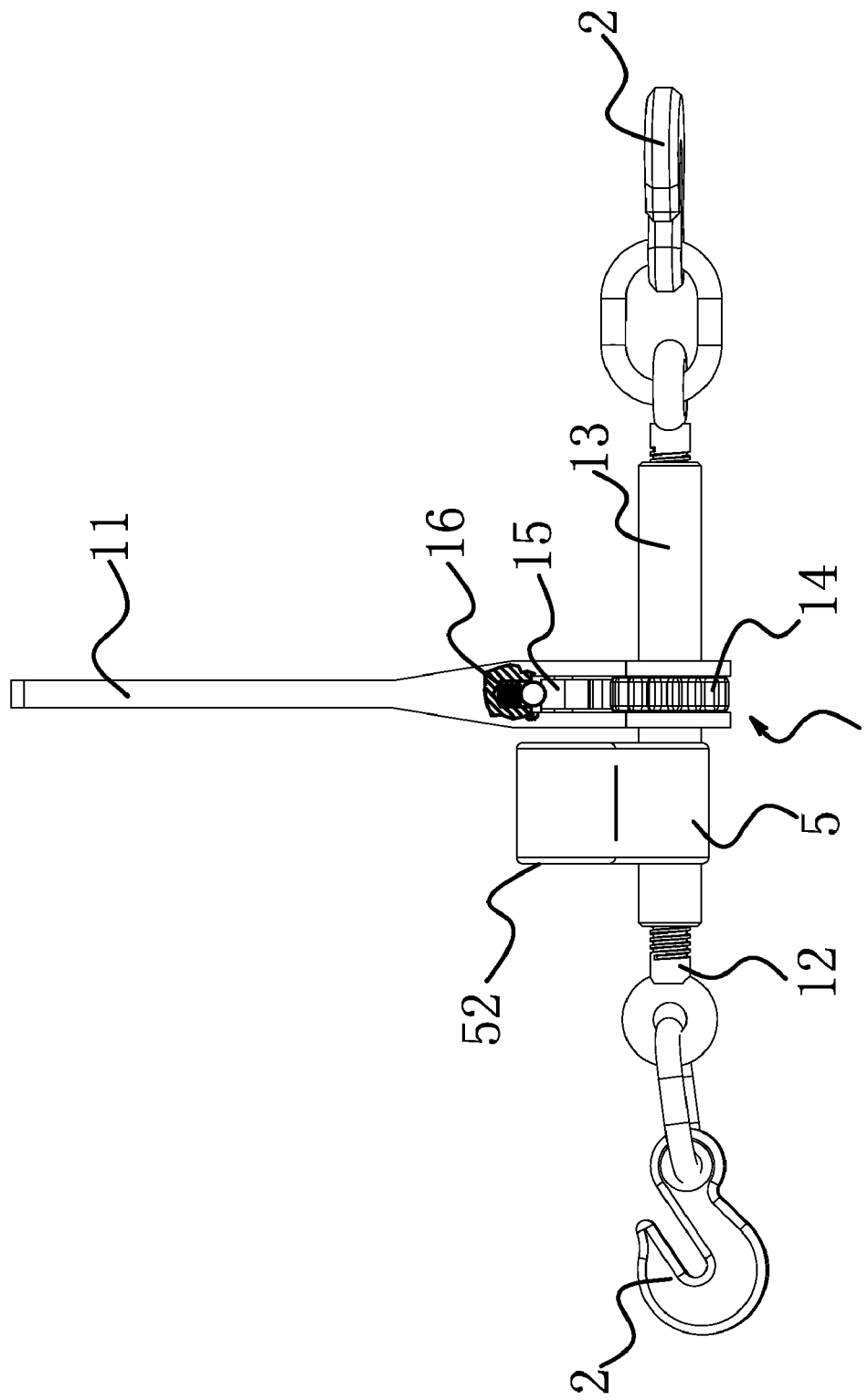
FIG. 3 is a front view of the load binder of the invention.
Figure 4:
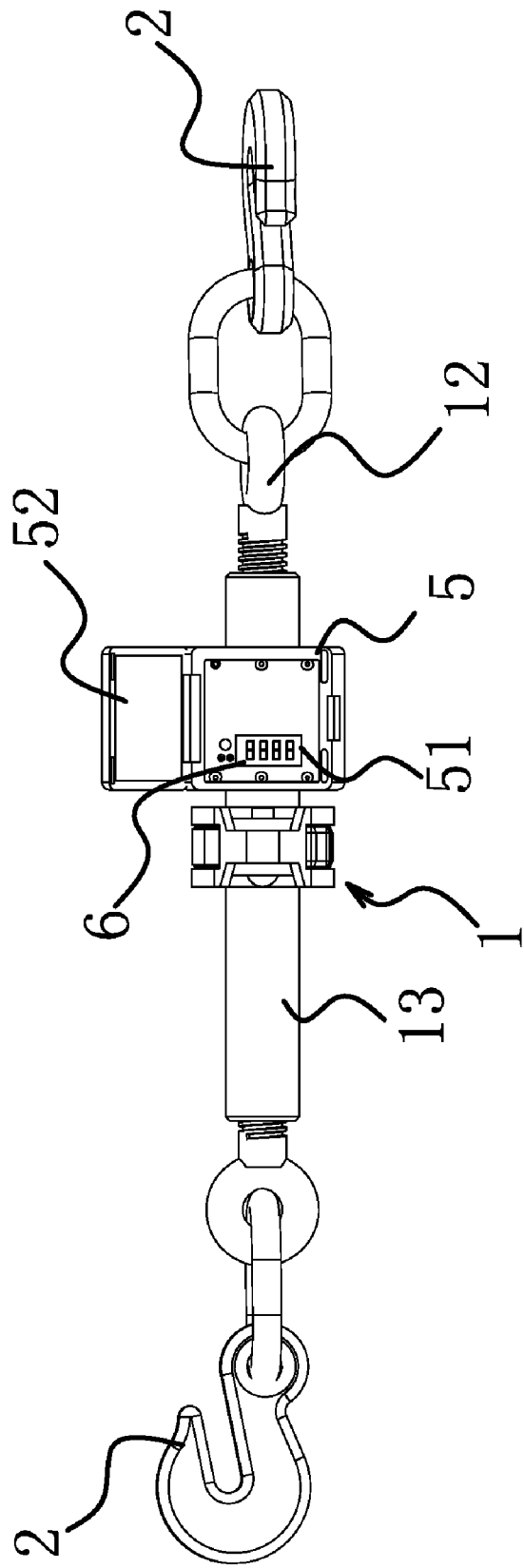
FIG. 4 is a top view of the load binder of the invention.
Figure 5:
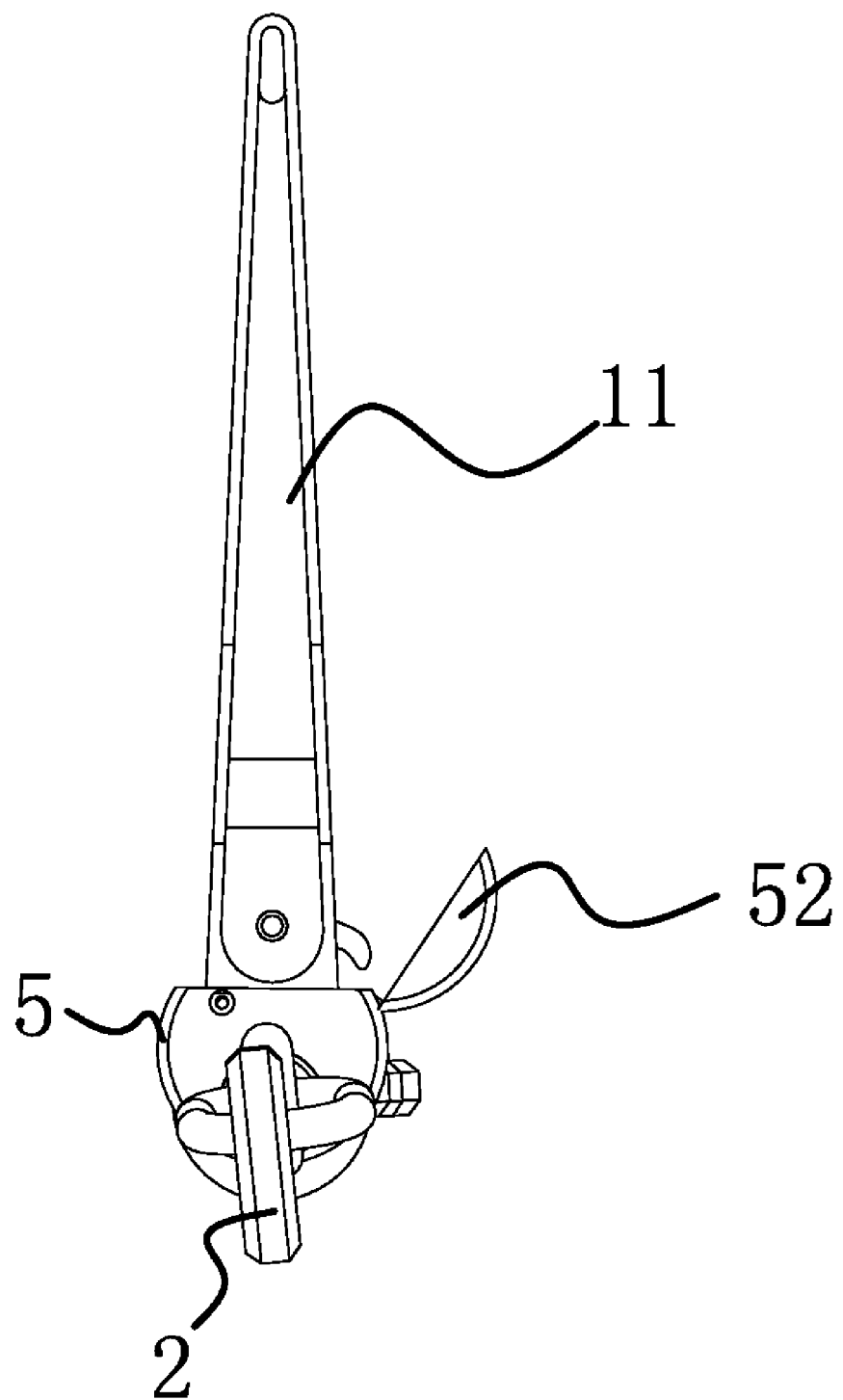
FIG. 5 is a side view of the load binder of the invention.

As shown in FIG. 3, a ratchet 14 is fixedly connected to the adjustment piece 13. An opening 11a is set at the inner end of the handle 11 and coupled with the adjustment piece 13. A pawl 15 is provided on the handle 11, which could be embedded among the teeth of the ratchet 14. A spring 16 is placed between the pawl 15 and the handle 11. The pawl 15 is embedded among the teeth of the ratchet 14 under the elastic force of the spring 16. The adjustment piece 13 could only continually turn in one way by way of the pawl 15 and ratchet 14 when the handle 11 is pulled to and fro. Obviously, the connection piece 12 could come closer to the adjustment piece 13 along the threads after the adjustment piece 13 continually turns in one way.

In FIG. 1, the sensor 3 is a resistance strain gauge and fixed on the outer wall of the adjustment piece 13. A casing 5 is held on the adjustment piece 13 outside the sensor 3. The signal processing circuit 4 connected with the sensor 3 is positioned within the casing 5. A groove 131 is set on the outer wall of the adjustment piece 13, in which the sensor is held.

In this embodiment, the display device includes a display 6 connected with the signal processing circuit 4. A window 51 is set on the casing 5, in which the display 6 is secured. A cover 52 is set on the casing 5 for covering the window 51. The casing 5 is made of plastic and fixed on the adjustment piece 13 by injection molding.

Figure 6:
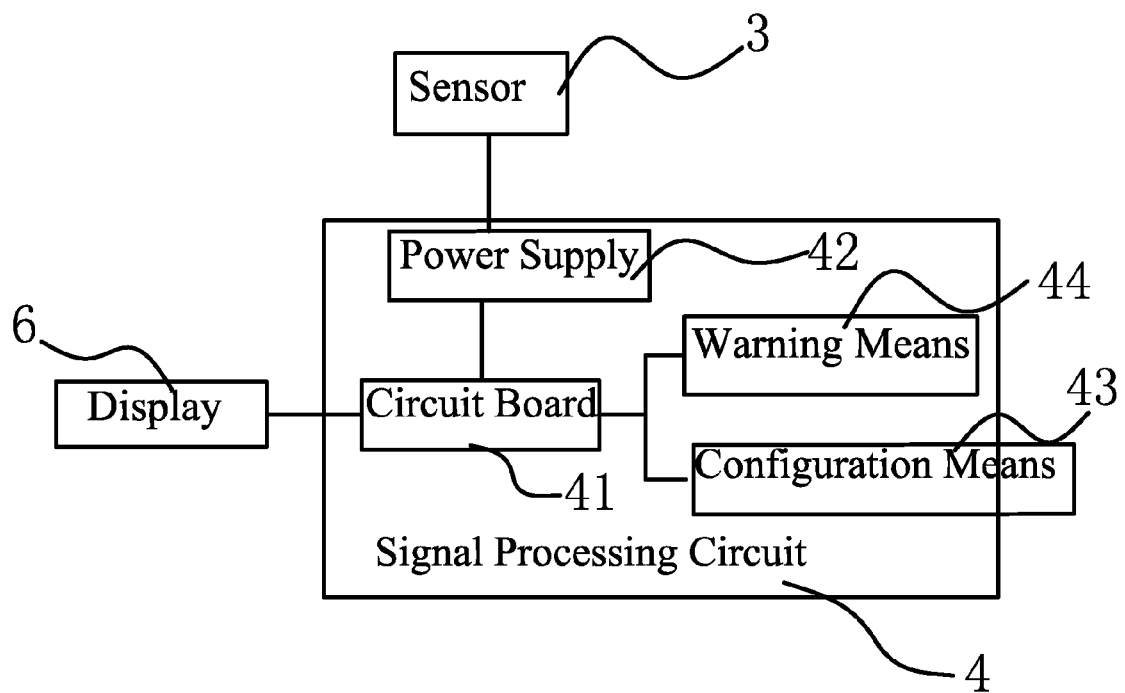
FIG. 6 is a block diagram of the electric structure of the first embodiment of the invention.

As shown in FIG. 6, the signal processing circuit 4 includes a circuit board 41 which could receive and process the signal corresponding to the size of the tensioning force and a power supply 42 connected to the circuit board for supplying power to the entire signal processing circuit 4. The power supply 42 is a storage battery. The circuit board 41 is further linked with a configuration means 43 for setting the threshold of the tensioning force and a warning means 44 for sending a warning signal when the tensioning force exceeds the set threshold.

In operation, the connection piece 12 could come closer to the adjustment piece 13 along the threads once the adjustment piece 13 is continually turned in one way by the handle 11, and thus the two hooks 2 come closer to bind goods tightly. The adjustment piece 13 is deformed under forces when the hooks 2 are closer, so that then sensor 3 held on the outer wall of the adjustment piece 13 could generate a signal corresponding to the size of the tensioning force. The magnitude of the tensioning force could be obtained through processing said signal by the signal processing circuit 4 and visually presented through the display 6. Therefore, the operator could understand the size of the tensioning force in time during operation. The maximum value of the tensioning force could be conveniently set by the configuration means 43. This way, the warning means 44 could send a warning signal in time when the tensioning force is equal to the set value. In this connection, the operator could stop operation in time when he/she receives the warning signal.

Second Embodiment

Figure 7:
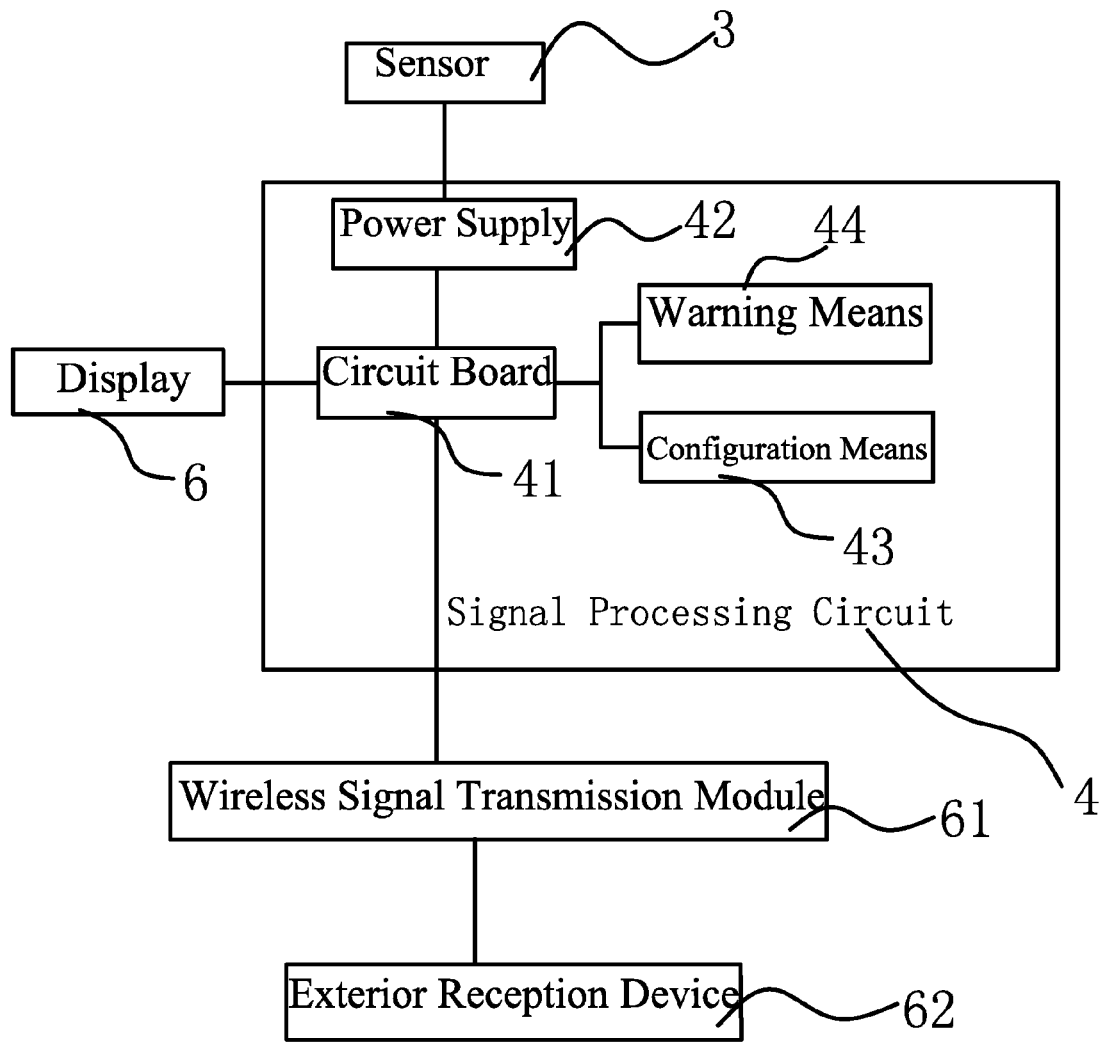
FIG. 7 is a block diagram of the electric structure of the second embodiment of the invention.

As shown in FIG. 7, the signal processing circuit 4 is further linked with a wireless signal transmission module 61 for transmitting a wireless signal and an exterior reception device 62 for receiving said wireless signal as compared with the first embodiment. The signal of the size of the tensioning force could be transferred to the exterior reception device 62 via the wireless signal transmission module 61. The operation condition of the load binder could be monitored in real time by the exterior reception device 62. A plurality of load binders could be monitored at the same time because of the exterior reception device 62.

The remaining features of the second embodiment are similar to those of the first embodiment. In particular, the operation procedure of the sensor 3 and other parts is also substantially identical in the said two embodiments. Therefore, the description thereof is omitted here for brevity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although these terms are used herein, such as tensioning mechanism 1, handle 11, opening 11a, connection piece 12, adjustment piece 13, groove 131, ratchet 14, pawl 15, spring 16, hook 2, sensor 3, signal processing circuit 4, circuit board 41, power supply 42, configuration means 43, warning means 44, casing 5, window 51, cover 52, display 6, wireless signal transmission module 61 and exterior reception device 62, the other similar terms could also be used. These terms are merely used to describe and explain the essence of the invention more conveniently, and any limitation to said terms is regarded as departing from the spirit of the invention.

LIST OF REFERENCE NUMERALS 1 tensioning mechanism
11 handle
11a opening
12 connection piece
13 adjustment piece
131 groove
14 ratchet
15 pawl
16 spring
2 hook
3 sensor
4 signal processing circuit
41 circuit board
42 power supply
43 configuration means
44 warning means
5 casing
51 window
52 cover
6 display
61 wireless signal transmission module
62 exterior reception device

What is claimed is:

1. A force measuring rigid load binder, comprising a tensioning mechanism having a handle, in which each of both ends of the tensioning mechanism is connected with a hook respectively, the tensioning mechanism is made of a rigid material, and the distance between two hooks is adjustable by the tensioning mechanism when the handle is pulled;

and a sensor is provided at a forced part of the tensioning mechanism, the sensor capable of generating a signal corresponding to the size of the tensioning force when the load binder is in operation, the sensor is connected with a signal processing circuit which is capable of receiving and processing said signal, and a display device is connected with the signal processing circuit to display the size of the tensioning force;

wherein the tensioning mechanism includes a connection piece and an adjustment piece, the connection piece is connected with a hook at an outer end and connected with one end of the adjustment piece through threads at an inner end, the other end of the adjustment piece is connected with the other hook, the handle is linked with the adjustment piece and could drive the adjustment piece to turn, and the forced part is the connection piece or the adjustment piece;

wherein the sensor is a resistance strain gauge and fixed on the outer wall of the adjustment piece, a casing is held on the adjustment piece outside the sensor, and the signal processing circuit connected with the sensor is positioned within the casing;

wherein the display device includes a wireless signal transmission module for transmitting a wireless signal and an exterior reception device for receiving said wireless signal linked with the signal processing circuit.

2. The force measuring rigid load binder as claimed in claim 1, characterized in that, the casing is made of plastic.

3. The force measuring rigid load binder as claimed in claim 1, characterized in that, the signal processing circuit includes a circuit board which is capable of receiving and processing the signal corresponding to the size of the tensioning force and a power supply connected to the circuit board for supplying power to the entire signal processing circuit, wherein the power supply is a storage battery.

4. The force measuring rigid load binder as claimed in claim 3, characterized in that, the circuit board is further linked with a configuration means for setting the threshold of the tensioning force and a warning means for sending a warning signal when the tensioning force exceeds the set threshold.

5. A force measuring rigid load binder, comprising a tensioning mechanism having a handle, in which each of both ends of the tensioning mechanism is connected with a hook respectively, the tensioning mechanism is made of a rigid material, and the distance between two hooks is adjustable by the tensioning mechanism when the handle is pulled;

and a sensor is provided at a forced part of the tensioning mechanism, the sensor capable of generating a signal corresponding to the size of the tensioning force when the load binder is in operation, the sensor is connected with a signal processing circuit which is capable of receiving and processing said signal, and a display device is connected with the signal processing circuit to display the size of the tensioning force;

wherein the signal processing circuit includes a circuit board which is capable of receiving and processing the signal corresponding to the size of the tensioning force and a power supply connected to the circuit board for supplying power to the entire signal processing circuit, wherein the power supply is a storage battery.

6. The force measuring rigid load binder as claimed in claim 5, wherein the tensioning mechanism includes a connection piece and an adjustment piece, the connection piece is connected with a hook at an outer end and connected with one end of the adjustment piece through threads at an inner end, the other end of the adjustment piece is connected with the other hook, the handle is linked with the adjustment piece and could drive the adjustment piece to turn, and the forced part is the connection piece or the adjustment piece.

7. The force measuring rigid load binder as claimed in claim 6, wherein the sensor is a resistance strain gauge and fixed on the outer wall of the adjustment piece, a casing is held on the adjustment piece outside the sensor, and the signal processing circuit connected with the sensor is positioned within the casing.

8. The force measuring rigid load binder as claimed in claim 7, wherein the display device includes a display connected with the signal processing circuit, a window is set on the casing, the display is secured in the window, and a cover is further set on the casing for covering the window.

9. The force measuring rigid load binder as claimed in claim 8, characterized in that, the circuit board is further linked with a configuration means for setting the threshold of the tensioning force and a warning means for sending a warning signal when the tensioning force exceeds the set threshold.

10. The force measuring rigid load binder as claimed in claim 7, characterized in that, the circuit board is further linked with a configuration means for setting the threshold of the tensioning force and a warning means for sending a warning signal when the tensioning force exceeds the set threshold.

11. The force measuring rigid load binder as claimed in claim 6, characterized in that, the circuit board is further linked with a configuration means for setting the threshold of the tensioning force and a warning means for sending a warning signal when the tensioning force exceeds the set threshold.

12. The force measuring rigid load binder as claimed in claim 5, characterized in that, the circuit board is further linked with a configuration means for setting the threshold of the tensioning force and a warning means for sending a warning signal when the tensioning force exceeds the set threshold.

* * * * *